United States Patent [19]
Goto et al.

[11] Patent Number: 5,786,009
[45] Date of Patent: Jul. 28, 1998

[54] PROCESS FOR PREPARING LOW-VISCOUS PASTA SAUCE CONTAINED IN CONTAINER

[75] Inventors: Hiroshi Goto; Mamoru Kanada, both of Saitama-ken, Japan

[73] Assignee: Nisshin Flour Milling Co., Ltd., Tokyo, Japan

[21] Appl. No.: 614,207

[22] Filed: Mar. 12, 1996

[30] Foreign Application Priority Data

Mar. 30, 1995 [JP] Japan ................. 7-095911
Mar. 30, 1995 [JP] Japan ................. 7-095912

[51] Int. Cl.$^6$ ................................................ A23L 1/39
[52] U.S. Cl. .................... 426/106; 426/589; 426/658; 426/661
[58] Field of Search ............................. 426/106, 578, 426/589, 658, 661

[56] References Cited

U.S. PATENT DOCUMENTS

| | | | |
|---|---|---|---|
| 3,959,514 | 5/1976 | Eastman | 426/589 |
| 3,987,207 | 10/1976 | Spaeti et al. | 426/661 X |
| 4,038,482 | 7/1977 | Eastman | 426/589 X |
| 4,303,451 | 12/1981 | Seidel et al. | 426/578 X |
| 4,428,972 | 1/1984 | Wurzburg et al. | 426/589 X |
| 5,178,895 | 1/1993 | Duckworth | 426/589 |
| 5,308,637 | 5/1994 | Richards et al. | 426/589 |
| 5,360,624 | 11/1994 | Okura et al. | 426/589 X |

FOREIGN PATENT DOCUMENTS 4-71473  3/1992  Japan.

*Primary Examiner*—Milton Cano
*Attorney, Agent, or Firm*—Young & Thompson

[57] ABSTRACT

A process for preparing a low-viscous pasta sauce contained in a container, comprising using 10 to 65% by weight of the water to be used in the formulation of a pasta sauce, 0.5 to 5.5% by weight of a waxy starch, and, if necessary, 0.5 to 3% by weight of wheat starch, based on the total weight of the pasta sauce immediately before being loaded into a container, together with other raw materials for the pasta sauce to prepare a condensed pasta sauce having a viscosity of 1,000 to 20,000 cp at 70° to 90° C., loading the condensed pasta sauce into the container, and loading the remaining water into the container after, simultaneously with, or before the loading of the condensed pasta sauce into the container, followed by a sterilization treatment by heating to make a pasta sauce having a viscosity of 500 cp or less at normal temperatures (25° C.).

4 Claims, No Drawings

PROCESS FOR PREPARING LOW-VISCOUS PASTA SAUCE CONTAINED IN CONTAINER

BACKGROUND OF THE INVENTION

1. Field of the Invention

The present invention relates to a process for preparing a low-viscous pasta sauce. More particularly the present invention relates to a process for preparing a so-called soup-type or cream-type low-viscous pasta sauce, and according to the present process a low-viscous pasta sauce contained in a container can be produced smoothly, the solid ingredients and liquid part of which pasta sauce can be uniformly loaded into individual containers, and which pasta sauce is very palatable and can give tasty cooked pastas when poured onto pastas.

2. Description of Related Art

With changes in life style, advance of women to social activities, etc., foods that can be eaten as they are without being cooked or can be eaten readily only after being simply warmed or similarly treated are more often consumed recently. Pasta sauces are also not exceptions and pasta sauces that are contained in retort packs or cans are popular recently. As pasta sauces, high-viscous sauces, such as meat sauces, are conventionally used, but, for example, due to diversification of taste of consumers, so-called soup-type low-viscous sauces whose viscosity is quite low or is little as seen in consomme soup and so-called cream-type low-viscous pasta sauces that are somewhat viscous as seen in cream soup have been recently put on sale numerously.

Since soup-type low-viscous pasta sauces are plain, palatable, and tasty and make pasta smooth and allow the pasta to pass through one's throat favorably when poured onto the pasta, soup-type low-viscous pasta sauces are favored by consumers and the demand for soup-type low-viscous pasta sauces is increased.

Also since cream-type pasta sauces are mild, relishable, and tasty and can adhere to pasta uniformly to give favorably tasty cooked pasta when poured to the pasta, cream-type pasta sauces are favored by consumers and the demand for cream-type pasta sauces is increased.

In preparing a pasta sauce that is contained in a retort pack or a can, generally, a method is used wherein a quantity of a pasta sauce is produced in a cooking pot or the like at a time, the produced pasta sauce is transported from the bottom or the like of the cooking pot through a pipeline by using a pump, optionally through a cushion tank, to a hopper of a loader, and is dispensed to be loaded into containers, such as retort pouches and cans, followed by a sterilization treatment by heating. In that case, if the pasta sauce is high in viscosity such as the case of meat sauce and the stirring in the cooling pot is satisfactory, such a problem that heavy solid ingredients settle out, for example, when the pasta sauce is transported to the hopper or is loaded into the containers, or oils and fats and the like that are light in weight come up to the surface will not happen, and a pasta sauce contained in containers with the solid ingredients and the liquid part evenly distributed and loaded into the individual containers can be obtained.

However, in the case of so-called soup-type or cream-type low-viscous pasta sauces, even if the stirring is carried out sufficiently in the cooking pot when the pasta sauce is produced, or even if a stirring apparatus is attached, for example, to the cushion tank or the hopper of the loader and the pasta sauce is temporarily stored or is loaded into the containers while stirring the pasta sauce, since the viscosity of the pasta sauce is low, ingredients low in specific gravity, such as oils and fats, come up to the upper part of the sauce while solid ingredients higher in specific gravity, such as vegetables, marine products, and meats, are apt to settle out in the lower part of the sauce. Therefore, when the pasta sauce is transported from the bottom of the cooking pot through the pipeline and the like to the loader and is loaded into containers, immediately after the start of the transportation, part of the pasta sauce containing many solid ingredients high in specific gravity is transported through the pipeline and is loaded into containers, and at the final stage of the transportation, part of the pasta sauce containing less solid ingredients and much liquid part is transported through the pipeline and is loaded into containers. As a result, a pasta sauce contained in containers that has a high content of solid ingredients and a pasta sauce contained in containers that has a low content of solid ingredients are produced, and the loaded contents of the containers become ununiform from container to container, which lowers the quality of the products and causes the reliability on the products to be damaged.

To avoid the non-uniform loading of the pasta sauce as mentioned above, a method is conventionally attempted wherein solid ingredients and a liquid part of a pasta sauce are separately loaded into each container. In this case, however, since a loading apparatus for solid ingredients and a loading apparatus for a liquid part are required, the cost of the facilities is high, the loading work becomes complicated, and consequently the price of the products is increased. Further, in the method wherein solid ingredients and a liquid part are loaded separately, in many cases the solid ingredients and the liquid part are cooked individually, the adjustment of the taste and flavor of the pasta sauce as a whole becomes difficult and a pasta sauce good in taste and flavor is difficult to obtain, which is a fault.

For the purpose of obviating the fault of the above method wherein solid ingredients and liquid part are separately loaded into containers, a method wherein potato starch and a modified starch are contained in liquid part of a soup containing solid ingredients that is not yet loaded so as to make the soup viscous so that the solid ingredients and the liquid part may be uniformly loaded into individual containers is suggested (Japanese Patent Application Laid-Open 4-71473). In the case of this method, although the ingredients can be prevented from settling out from the soup to some extent and the problem of the ununiform loading is solved to some extent, due to the use of the potato starch and the modified starch, the product obtained after loading into containers and a sterilization treatment by heating remains considerably viscous, and it is found that the method is not suitable for producing low-viscous soup-type or cream-type pasta sauces.

SUMMARY OF THE INVENTION

An object of the present invention is to provide a high-quality low-viscous pasta sauce that does not allow, when transported through a pipeline or the like from a cooking pot or the like or loaded into containers, solid ingredients and the like in the pasta sauce to settle out and separate from the liquid part, permits the ingredients and the liquid part to be loaded uniformly into individual containers, is very palatable, and can give tasty cooked pasta when poured to pastas and to provide a process of the preparation thereof.

In order to attain the above object, the present inventors have studied low-viscous pasta sauces contained in containers in various-manners from many points of view including their raw materials, ways of cooking, ways of loading into containers, loading apparatuses and so on. As a result, it has been found that when use is made of 10 to 65% by weight of the water to be used in the formulation of a pasta sauce and, as components for making a sauce viscous, a waxy starch and, if necessary, wheat starch instead of potato starch and a modified starch used in the above prior art to prepare a condensed pasta sauce having a viscosity of 1,000 to 2,000 cp that is higher than that of the final product, and the resulting condensed pasta sauce is loaded into containers, solid ingredients and liquid part in the pasta sauce can be loaded into individual containers uniformly from container to container, and when the remaining water is added to the pasta sauce loaded into the container followed by a sterilization treatment by heating, a quite palatable low-viscous pasta sauce having a viscosity of 500 cp or less at normal temperatures can be obtained, which has led to the completion of the present invention.

That is, the present invention provides a process for preparing a low-viscous pasta sauce contained in a container, comprising using 10 to 65% by weight of the water to be used in the formulation of a pasta sauce, 0.5 to 5.5% by weight-of a waxy starch, and, if necessary, 0.5 to 3% by weight of wheat starch, based on the total weight of the pasta sauce immediately before being loaded into a container, together with other raw materials for the pasta sauce to prepare a condensed pasta sauce having a viscosity of 1,000 to 20,000 cp at 70° to 90° C., loading the condensed pasta sauce into the container, and loading the remaining water into the container after, simultaneously with, or before the loading of the condensed pasta sauce into the container, followed by a sterilization treatment by heating to make a pasta sauce having a viscosity of 500 cp or less at normal temperatures (25° C.).

Specifically, the present invention provides a process for preparing a soup-type low-viscous pasta sauce contained in a container given under (i) below and a process for preparing a cream-type low-viscous pasta sauce contained in a container given under (ii) below. (i) A process for preparing a soup-type low-viscous pasta sauce contained in a container, comprising using 10 to 40% by weight of the water to be used in the formulation of a pasta sauce and 1.5 to 5.5% by weight of a waxy starch, based on the total weight of the pasta sauce immediately before being loaded into a container, together with other raw materials for the pasta sauce to prepare a condensed pasta sauce having a viscosity of 1,000 to 7,000 cp at 70° to 90° C., loading the condensed pasta sauce into the container, and loading the remaining water into the container after, simultaneously with, or before the loading of the condensed pasta sauce into the container, followed by a sterilization treatment by heating to make a pasta sauce having a viscosity of 50 cp or less at normal temperatures (25° C.). (ii) A process for preparing a cream-type low-viscous pasta sauce contained in a container, comprising using 30 to 65% by weight of the water to be used in the formulation of a pasta sauce, 0.5 to 3% by weight of a waxy starch, and 0.5 to 3% by weight of wheat starch, based on the total weight of the pasta sauce immediately before being loaded into a container, together with other raw materials for the pasta sauce to prepare a condensed pasta sauce having a viscosity of 5,000 to 20,000 cp at 70° to 90° C., loading the condensed pasta sauce into the container, and loading the remaining water into the container after, simultaneously with, or before the loading of the condensed pasta sauce into the container, followed by a sterilization treatment by heating to make a pasta sauce having a viscosity of 50 to 500 cp at normal temperatures (25° C.).

Further, in the present invention, the process for preparing a cream-type low-viscous pasta sauce contained in a container given under (ii) above includes as a preferable mode the process for preparing a pasta sauce, wherein when said condensed pasta sauce is prepared, 0.5 to 3% by weight of a modified starch based on the total weight of the pasta sauce immediately before being loaded into a container is used together with said waxy starch and said wheat starch.

Further, the present invention also includes a pasta sauce contained in a container obtained by the above processes.

In the case of the present process for preparing a soup-type low-viscous pasta sauce contained in a container given under (i) above, the solid ingredients and the liquid part are loaded uniformly into individual containers and a tasty and high-quality soup-type low-viscous pasta sauce contained in a container that is quite low in viscosity or little viscous with the viscosity being 50 cp or less at normal temperatures (25° C.), is plain and palatable, and makes pasta smooth and passed through one's throat agreeably when poured to the pasta can be obtained quite smoothly with the pasta sauce uniform from one product to another.

Further, in the case of the present process for preparing a cream-type low-viscous pasta sauce contained in a container given under (ii) above, the solid ingredients and the liquid part are loaded uniformly into individual containers and a tasty and high-quality cream-type low-viscous pasta sauce contained in a container that is somewhat viscous with the viscosity being 50 to 500 cp at normal temperatures (25° C.), is mild, creamy, relishable, and good in adhesion to pasta can be obtained quite smoothly with the pasta sauce uniform from one product to another.

Herein, the value of the viscosity of the pasta sauce before and after being loaded into a container that is mentioned in this specification refers to the value of the viscosity measured by the following method.

Method of Measuring Viscosity of Pasta Sauce:

(1) Viscosity at 70° to 90° C.:

The pasta sauce was strained through a 9-mesh net to remove the solid ingredients, the passed liquid was placed in each container, the containers were allowed to stand in constant-temperature baths for 5 min at respective temperatures, and the viscosity was determined by using a Brookfield type viscometer (model: BL, manufactured by Tokimec INC), and carrying out the measurement after rotating a rotor (No. 4 rotor) at 60 rpm (in the case of a soup-type pasta sauce) or 12 rpm (in the case of a cream-type pasta sauce) for 1 min.

(2) Viscosity at normal temperatures (25° C.):

The pasta sauce was strained through a 9-mesh net to remove the solid ingredients, the passed liquid was placed in a container, the container was allowed to stand in a constant-temperature bath for 5 min at a temperature of 25° C., and the viscosity was determined by using a Brookfield type viscometer (model: BL, manufactured by Tokimec INC), and carrying out the measurement after rotating a rotor (No. 1 rotor) at 60 rpm (in the case of a soup-type pasta sauce) or 12 rpm (in the case of a cream-type pasta sauce) for 1 min.

In the present invention, a "low-viscous pasta sauce" may be any pasta sauce having a viscosity of 500 cp or less at normal temperatures (25° C.) that is a final product obtained by loading it into a container and by a sterilization treatment by heating and there are no restrictions on the type or the like of the pasta sauce. Therefore, with respect to the present low-viscous pasta sauce, if the low-viscous pasta sauce has a viscosity of 500 cp or less at normal temperatures, types of solid ingredients to be contained in the pasta sauce, raw materials, spices, seasonings and the like to used in the production of the pasta sauce are not particularly restricted, and any solid ingredients, raw materials, spices, seasonings and the like suitable for the particular pasta sauce may be used to produce the pasta sauce. For the present low-viscous pasta sauce, use can be made of, as solid ingredients, for example, but not limited to, vegetables, such as carrots, potatoes, onions, green peppers, cauliflower, broccoli, and bamboo shoots; fungi, such as shiitakes, champignons, mushrooms, enokidakes (*flamulina velutipes*), maitakes (*grifola frondosa*), and Jew's-ears; corn and other cereals; beans, such as green peas; marine plants; fishery products, such as short-necked clams, fresh water clams, clams, scallops, shrimps, crabs, squids, octopus, sardines, tunas, salmons, horse mackerels, and sea breams; meats of livestock, such as pork, beef, and chicken; livestock products, such as hams, bacon, and sausages; and dairy products, such as cheese. As other raw materials, seasonings, spices and the like to be used in the pasta sauce, a variety of materials, for example, oils and fats, such as butter, salad oil, olive oil, and margarine; dairy products, such as milk, concentrated milk, skim milk, other processed milks, and condensed milk; wine, beer, sake, brandy, ketchup, sauce, vinegar, wine vinegar, and the like; salt (sodium chloride); saccharides, such as sugar, molasses, and honey; sodium glutamate; and spices, such as ginger, garlic, and pepper, can be used.

The contents of solids, such as solid ingredients, in the present low-viscous pasta sauce are not particularly restricted and can be adjusted according to the type of pasta sauce, but generally it is preferable that the content of solids in the final product loaded into a container falls in the range of about 5 to 40% by weight because in that case the uniform loading into containers can be more easily carried out and the taste of the obtained pasta sauce does not become too heavy.

DETAILED DESCRIPTION OF THE INVENTION

The present process for preparing a low-viscous pasta sauce contained in a container will be described in more detail with respect to a preferable process for preparing a soup-type low-viscous pasta sauce and a preferable process for preparing a cream-type low-viscous pasta sauce.

First, the present process for preparing a soup-type low-viscous pasta sauce will be described in detail.

In the present invention, the method of cooking a pasta sauce and the like are not particularly restricted and a suitable cooking method can be adopted in accordance, for example, with the type of pasta sauce and the materials to be used. However, in the present process for preparing a soup-type low-viscous pasta sauce, it is required that, at the step of cooking a condensed pasta sauce before being loaded into a container, cooking is carried out by using water in an amount of 10 to 40% by weight, preferably 25 to 35% by weight, based on the total weight of the water to be used in the formulation of the intended pasta sauce.

Herein, water referred in the present invention includes, not only water and hot water, but also water contained in aqueous liquid materials, such as soy sauce, milk, and wine. Therefore, in the present soup-type low-viscous pasta sauce, the water contained in these liquid materials is taken into consideration.

If the amount of water used at the time of cooking is less than 10% by weight based on the total weight of water to be used in the formulation of the intended pasta sauce, the adjustment of the taste and flavor of the pasta sauce at the time of cooking becomes difficult and the taste and flavor of the final product obtained by loading the pasta sauce into a container, adding the remaining water, and carrying out a sterilization treatment by heating becomes poor. On the other hand, if the amount of water used at the time of cooking is over 40% by weight based on the total weight of water to be used in the formulation of the intended pasta sauce, even when a waxy starch is used in an amount in the range of 1.5 to 5.5% by weight, it becomes difficult that the condensed pasta sauce immediately before being loaded into containers is brought to have a viscosity of 1,000 cp or more at 70° to 90° C. and ununiform loading will occur. In that case, if a waxy starch is used in an amount of over 5.5% by weight to make the condensed pasta sauce immediately before being loaded have a viscosity of 1,000 cp or more, after the condensed pasta sauce is loaded into a container and the remaining water is loaded into the container followed by a sterilization treatment by heating, the viscosity of the final product at normal temperatures (25° C.) does not fall to 50 cp or less and therefore a light and tasty soup-type low-viscous pasta sauce cannot be obtained.

The addition of water at the time of preparation of the condensed pasta sauce before being loaded may be effected at a time or at several times depending on types of the pasta sauce or cooking methods. In short, it may be enough that the total amount of water used before being loaded into a container falls within the range of 10 to 40% by weight based on the total weight of water to be used in the formulation of the intended pasta sauce.

Further, in the present process for preparing a soup-type low-viscous pasta sauce, at a step before the pasta sauce is loaded into a container, a waxy starch is added to the pasta sauce in an amount of 1.5 to 5.5% by weight based on the total weight of the pasta sauce immediately before being loaded into the container to make a condensed pasta sauce having a viscosity of 1,000 to 7,000 cp at 70° to 90° C.

The waxy starch used in the present invention is a starch obtained from cereals of a waxy species (glutinous species) and typical examples thereof are waxy corn starch obtained from waxy corn (glutinous corn), starch obtained from glutinous rice, and starch obtained from glutinous millet. In particular, waxy corn starch is preferable because of availability and the like.

If the amount of the waxy starch to be added is less than 1.5% by weight based on the total weight of the condensed pasta sauce immediately before being loaded into a container, it becomes impossible that the viscosity of the condensed pasta sauce at 70° to 90° C. is brought to 1,000 cp or more and the solid ingredients and liquid part cannot be loaded into individual containers uniformly from container to container. On the other hand, if the amount of the waxy starch to be added is over 5.5% by weight based on the total weight of the condensed pasta sauce immediately before being loaded into a container, the viscosity of the condensed pasta sauce at 70° to 90° C. will be over 7,000 cp, and if a condensed pasta sauce having a viscosity of over 7,000 cp is loaded into a container and the remaining water is loaded followed by a sterilization treatment by heating, the viscosity of the final product at normal temperatures will not fall to 50 cp or less and a light soup-type low-viscous pasta sauce cannot be obtained. The amount of the waxy starch to be added is preferably 1.8 to 4.5% by weight based on the total weight of the condensed pasta sauce immediately before being loaded into a container.

The timing at which the waxy starch is added to the pasta sauce may be at any stage if it is added before the loading of the pasta sauce into a container. If the waxy starch is added at an early stage of the cooking, the viscosity of the materials to be cooked becomes too high to make the cooking easy, and therefore it is preferable that the waxy starch is added at a point where the cooking of the pasta sauce is almost completed and after the addition, the condensed pasta sauce is heated for a little while with stirring to adjust the viscosity to the above-mentioned 1,000 to 7,000 cp, followed by loading into a container. In the addition of the waxy starch to the pasta sauce, by using part of the above-mentioned 10 to 40% by weight of water that will be used until the pasta sauce is loaded into a container so that the waxy starch may be dispersed into that part of water and by adding the dispersion to the pasta sauce, the waxy starch can be dispersed into the pasta sauce uniformly and quickly, so that the waxy starch can be prevented from being dispersed incompletely or from forming powder lumps or the like due to undissolved waxy starch.

The loading of the condensed pasta sauce whose viscosity has been adjusted to 1,000 to 7,000 (70° to 90° C.) may be carried out by using a loading apparatus and loading method for pasta sauces that are conventionally used and is not particularly restricted. For example, it is suitable that the condensed pasta sauce that has been cooked in a cooking pot as mentioned above and whose viscosity has been adjusted to 1,000 to 7,000 cp (70° to 90° C.) is fed to a hopper or the like of a loader through a pipeline, for example, by using a transportation pump and then is loaded to individual containers, and in this case the hopper may be or may not be equipped with a stirrer. Although there are no particular restrictions on the temperature of the pasta sauce when the pasta sauce is loaded into containers, it is preferable that the pasta sauce is loaded into containers while the temperature of the cooked condensed pasta sauce is still in the range of 70° to 90° C., because the viscosity of the condensed pasta sauce can be retained within the above-mentioned range of 1,000 to 7,000 cp to effectively prevent solid ingredients and liquid part from being loaded ununiformly, and also the heating efficiency can become favorable due to a reduction in the amount of heat applied from outside that is required for the below-mentioned sterilization treatment by heating. The container into which the pasta sauce will be loaded may be any one if it can withstand a sterilization treatment by heating. For example, a variety of retort pouches, cans for canned foods, and bottles that are conventionally used can be used.

After, simultaneously with, or before the loading of the pasta sauce into containers, the remaining water (that is, water in an amount of 90 to 60% based on the total weight of the water to be used in the formulation of the pasta sauce) is loaded into the containers. At that time, although the temperature of the water is not particularly restricted, it is preferable that the temperature of the water is made approximately equal to that of the condensed pasta sauce loaded into the container because the condensed pasta sauce to be loaded into the container and the remaining water are mixed uniformly.

Before, simultaneously with, or after sealing the container into which the pasta sauce and the remaining water are loaded, a sterilization treatment by heating is carried out. Although the temperature and time of the sterilization treatment by heating can be adjusted in accordance, for example, with the type of pasta sauce, generally the sterilization treatment by heating is suitably carried out at a temperature of about 102° to 130° C. for about 10 to 90 min.

By carrying out the above series of processes, a tasty and high-quality soup-type low-viscous pasta sauce contained in containers that is plain and palatable, has a viscosity of 50 cp or less at normal temperatures (25° C.), i.e., a very low viscosity or little viscosity, and makes pasta smooth and passed through one's throat agreeably when poured to the pasta can be obtained smoothly with the solid ingredients and the liquid part uniformly loaded into the respective containers without causing unevenness from one product to another.

Now the present process for preparing a cream-type low-viscous pasta sauce will be described in detail.

The present process for preparing a cream-type low-viscous pasta sauce is carried out in the same way as the above-described present process for preparing a soup-type low-viscous pasta sauce, except that (1) the amount of water used at the time of cooking is 30 to 65% by weight, preferably 35 to 60% by weight, of the water to be used in the formulation of the pasta sauce, (2) at any step before the pasta sauce is loaded into a container, a waxy starch and wheat starch in amounts of 0.5 to 3% by weight and 0.5 to 3% by weight respectively based on the total weight of the pasta sauce immediately before being loaded into the container are added to the pasta sauce to prepare a condensed pasta sauce having a viscosity of 5,000 to 20,000 cp at 70° to 90° C., and (3) the viscosity of the pasta sauce is to be 50 to 500 cp at normal temperature after a sterilization treatment by heating.

If the amount of water to be used at the time of cooking is less than 30% by weight based on the total weight of the water to be used in the formulation of the pasta sauce, at the time of the cooking of the pasta sauce, the adjustment of its taste and flavor becomes difficult and the final product obtained by loading the pasta sauce and the remaining water into containers followed by a sterilization treatment by heating becomes poor in taste and flavor.

On the other hand, when the amount of water to be used at the time of cooking is over 65% by weight based on the total weight of the water to be used in the formulation, even if a waxy starch and wheat starch are used in the above-mentioned ranges of 0.5 to 3% by weight and 0.5 to 3% by weight respectively, it becomes difficult to bring the viscosity of the condensed pasta sauce immediately before being loaded into a container to 5,000 cp or more and ununiform loading occurs. Further, in this case, if a waxy starch is used in an amount of over 3% by weight in order to make the viscosity of the condensed pasta sauce immediately before being loaded have 5,000 cp or more, when the condensed pasta sauce is loaded into a container and the remaining water is loaded into the container followed by a sterilization treatment by heating, the viscosity of the final product at normal temperatures (25° C.) becomes too high to reach 50 to 500 cp and a cream-type low-viscous pasta sauce that is mild, relishable and tasty cannot be obtained.

The wheat starch used in the present invention is a starch obtained from wheat and the process for preparing the wheat starch or the like is not particularly restricted.

Further, in the present process for preparing a cream-type low-viscous pasta sauce, it is required to use both a waxy starch and wheat starch as described above.

If only a waxy starch is used, by using the waxy starch in an amount of over 3% by weight, it is possible to make the condensed pasta sauce immediately before being loaded have 5,000 or more at 70° to 90° C., but when the condensed pasta sauce is loaded into a container and the remaining water is loaded into the container followed by a sterilization treatment by heating, the viscosity of the final product at normal temperatures (25° C.) becomes lower than 50 cp and does not fall in the range of 50 to 500 cp, and a cream-type low-viscous pasta sauce that is mild, relishable and tasty cannot be obtained.

Further, if only wheat starch is used, the viscosity of the pasta sauce at normal temperatures (25° C.) after the sterilization treatment by heating becomes considerably higher than 500 cp and does not fall within the range of 50 to 500 cp and also it becomes impossible to obtain a cream-type low-viscous pasta sauce that is mild, relishable and tasty.

Further, even when both a waxy starch and wheat starch are used, if the amount of the waxy starch to be added and the amount of the wheat starch to be added are outside the range of the present invention, it becomes difficult that the viscosity of the condensed pasta sauce at 70° to 90° C. is brought to 5,000 to 20,000 and that the viscosity of the pasta sauce at normal temperatures after a sterilization treatment by heating is brought to the range of 50 to 500 cp. In the present invention, it is preferable to prepare a condensed pasta sauce by adding a waxy starch and wheat starch in amounts of 1 to 2.5% by weight and 1 to 2.5% by weight respectively based on the total weight of the pasta sauce immediately before being loaded into a container.

Further, in the present invention, when a waxy starch and wheat starch are used in the above-mentioned amounts at the time of the preparation of the condensed pasta sauce and a modified starch is additionally used at the time of the preparation of the condensed pasta sauce in an amount of 0.5 to 3% by weight, preferably 1 to 2.5% by weight, based on the total weight of the condensed pasta sauce immediately before being loaded into a container, an excellent effect of making the taste more smooth can be obtained. Herein, the term "modified starch" refers to a starch obtained by processing starches obtained from various raw materials, for example, with oils and fats, acids, alkalis, enzymes, or oxidizing agents, or application of heat. Examples of the modified starch include oils-and-fats-modified starch, α-starch, soluble starch, carboxy-methyl starch, phosphatized starch, oxidized starch, and cross-linked starch. Among these, cross-linked starch is preferably used as a modified starch.

According to the above-described present process for preparing a cream-type low-viscous pasta sauce, a tasty and high-quality cream-type low-viscous pasta sauce contained in containers that is mild, creamy and relishable, has a viscosity of 50 to 500 cp at normal temperatures (25° C.), i.e., a little viscosity, and adheres well to pasta when poured to the pasta can be obtained smoothly with the solid ingredients and the liquid part uniformly loaded into the respective containers without causing unevenness from one product to another.

Now the present invention will be described specifically with reference to Examples given below, but the present invention is not restricted by them. In the following Examples, the percentages quoted represent percentages by weight. Further, the following Examples 1 to 5 are examples of the process for preparing a soup-type low-viscous pasta sauce and the following Examples 6 to 9 are examples of the process for preparing a cream-type low-viscous pasta sauce.

EXAMPLE 1

(1) 30 kg of butter and 65 kg of soybean salad oil were placed and heated in a cooking pot equipped with a steam jacket and 25 kg of grated ginger was added and fried. Then, after 100 kg of loosened shampignons, 150 kg of thinly sliced shiitakes, and 12 kg of thinly sliced mushrooms were added, and water was added to make 580 kg, followed by heating to 90° C. Seasonings and spices in an amount 20 kg in all were added thereto, then 26 kg of waxy corn starch dispersed in 74 kg of water was charged thereinto, and they were heated to 90° C. with stirring to obtain a condensed pasta sauce having a viscosity of 3,500 cp at 70° C. (the added amount of the waxy corn starch was 3.7% based on the total weight of the condensed pasta sauce).

(2) The condensed pasta sauce obtained above was placed in a hopper equipped with a stirrer of a retort pouch packing loader (FM4010 model manufactured by Izumi Food Machinery CO., LTD.) from the bottom of the cooking pan through a pipeline using a transportation pump, and was loaded into retort pouches in a proportion of 80 g/pouch (the temperature of the condensed pasta sauce at the time of loading was 70° C.), then water at a temperature of 70° C. was loaded in a proportion of 60 g/pouch, and the pouches were sealed, followed by a sterilization treatment by heating at a temperature of 130° C. for 15 min.

(3) In the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out. One item out of the three items of each of the three sets was measured in a manner shown below with respect to the proportion of the solid ingredients (solids) contained in the pasta sauce, which gave the results shown in Table 2. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 below, and their average value was taken, which results are shown in Table 2 below.

The Measurement of the Contained Proportion of Solid Ingredients (Solids) in the Pasta Sauce:

The pouch was opened, the contents were strained through a 9-mesh screen, the solid ingredients (solids) remained on the screen were weighed, and the contained proportion (%) of the solids was determined in accordance with the following formula:

Contained proportion of solid ingredients (%) =(B/A)× 100 wherein

A=the total weight (140 g) of the pasta sauce loaded into one pouch, and

B=the weight (g) of solid ingredients (solids) remained on the screen.

TABLE 1

Evaluation criteria of the quality of the pasta sauce

| Evaluation Point | Meaning |
|---|---|
| Point 5: | The solid ingredients were contained in the pasta sauce in a suitable amount to make the taste good, the liquid part of the pasta sauce was light and not viscous at all and was quite palatable, and the spaghetti was made smooth, was made agreeably passed through the panelist's throat, and was quite tasty. |
| Point 4: | The solid ingredients were contained in the pasta sauce in a suitable amount to make the taste good, the liquid part of the pasta sauce was light and almost not viscous and was palatable, and the spaghetti was made smooth, was made agreeably passed through the panelist's throat, and was tasty. |

TABLE 1-continued

Evaluation criteria of the quality of the pasta sauce

| Evaluation Point | Meaning |
|---|---|
| Point 3: | The solid ingredients were contained in the pasta sauce in an approximately suitable amount to make the taste nearly good, the liquid part of the pasta sauce was low in viscosity and was a little palatable, and the spaghetti was made nearly smooth, was made nearly agreeably passed through the panelist's throat, and was nearly tasty. |
| Point 2: | The solid ingredients were a little insufficient in the pasta sauce, the liquid part of the pasta sauce was viscous and a little poor in palatability, and the spaghetti was a little poor in smoothness, was made a little poorly passed through the panelist's throat, and was a little poor in taste. |
| Point 1: | The solid ingredients were considerably insufficient in the pasta sauce, the liquid part of the pasta sauce was rather viscous and poor in palatability, and the spaghetti was poor in smoothness, was made poorly passed through the panelist's throat, and was poor in taste. |

EXAMPLES 2 and 3

(1): (1) and (2) of Example 1 were repeated to prepare pasta sauces contained in pouches, except that, in (1) of Example 1, instead of charging 26 kg of waxy corn starch dispersed in 74 kg of water, charging 13 kg of waxy corn starch dispersed in 87 kg of water was carried out to obtain a condensed pasta sauce having a viscosity of 1,300 cp at 70° C. (the added amount of the waxy corn starch was 1.9% based on the total weight of the condensed pasta sauce) (Example 2), or charging 36 kg of waxy corn starch dispersed in 64 kg of water was carried out to obtain a condensed pasta sauce having a viscosity of 6,500 cp at 70° C. (the added amount of the waxy corn starch was 5.1% based on the total weight of the condensed pasta sauce) (Example 3).

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 2 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 above, and their average value was taken, which results are shown in Table 2 below.

Comparative Examples 1 and 2

(1): (1) and (2) of Example 1 were repeated to prepare pasta sauces contained in pouches, except that, in (1) of Example 1, instead of charging 26 kg of waxy corn starch dispersed in 74 kg of water, charging 8 kg of waxy corn starch dispersed in 92 kg of water was carried out to obtain a condensed pasta sauce having a viscosity of 820 cp at 70° C. (the added amount of the waxy corn starch was 1.1% based on the total weight of the condensed pasta sauce) (Comparative Example 1), or charging 45 kg of waxy corn starch dispersed in 55 kg of water was carried out to obtain a condensed pasta sauce having a viscosity of 9,200 cp at 70° C. (the added amount of the waxy corn starch was 6.4% based on the total weight of the condensed pasta sauce) (Comparative Example 2).

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 2 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 above, and their average value was taken, which results are shown in Table 2 below.

TABLE 2

|  |  | Examples | | | Comparative Examples | |
|---|---|---|---|---|---|---|
|  |  | 1 | 2 | 3 | 1 | 2 |
| Condensed pasta sauce | Added amount of WC starch[1] (%) | 3.7 | 1.9 | 5.1 | 1.1 | 6.4 |
|  | Used proportion of water (%) | 34.1 | 35.2 | 33.3 | 35.6 | 32.5 |
|  | Viscosity (70° C.) (cp) | 3500 | 1300 | 6500 | 820 | 9200 |
|  | Viscosity (25° C.) (cp) | 20 | 0 | 50 | 0 | 85 |
| Pasta sauce contained in | Contained proportion of solid ingredients (%) | | | | | |
| containers | Immediately after the start | 33 | 32 | 34 | 45 | 32 |
|  | At the middle | 31 | 34 | 32 | 21 | 32 |
|  | Immediately after the end | 34 | 33 | 32 | 5 | 34 |
| Quality |  | 4.8 | 5.0 | 4.4 | 1.0 | 1.4 |

[1] Waxy corn starch

From the results shown in Table 2 above, in the cases of Examples 1 to 3 wherein 10 to 40% of water to be used in the formulation of the pasta sauce and waxy corn starch in an amount of 1.5 to 5.5% based on the total weight of the pasta sauce immediately before being loaded into a container were used together with other raw materials for the pasta sauce to prepare a condensed pasta sauce having a viscosity of 1,000 to 7,000 cp at 70° to 90° C., the condensed pasta sauce was loaded into a container, and the remaining water was loaded into the container, followed by a sterilization treatment by heating to prepare a pasta sauce contained in containers, it can be understood that the solid ingredients and liquid part can be loaded uniformly into the respective pouches without unevenness from pouch to pouch, the obtained pasta sauce has a viscosity of 50 cp or less at normal temperatures, the liquid part of the pasta sauce is not viscous at all or is quite low in viscosity, the pasta sauce is light and palatable, and therefore spaghetti onto which the pasta sauce is poured is made smooth, is made passed through one's throat, and is quite tasty.

In contrast, in the case of Comparative Example 1 wherein the viscosity of the pasta sauce before being loaded was lower than 1,000 cp, it can be understood that the solid ingredients and the liquid part are not uniformly loaded into pouches and it happens that there are pouches containing large amounts of solid ingredients and pouches containing small amounts of solid ingredients.

Further, in the case of Comparative Example 2 wherein the added amount of a waxy corn starch was 6.4% which was larger than that of the present invention, it can be understood that a low-viscous pasta sauce that is light and palatable cannot be obtained and spaghetti onto which the obtained pasta sauce is poured is not smooth and is not made agreeably passed through one's throat.

EXAMPLE 4

(1) 35 kg of olive oil and 35 kg of soybean salad oil were placed and heated in a cooking pot equipped with a steam jacket and 20 kg of finely chopped garlic was added and fried. Then, after 120 kg of shampignons, 45 kg of carrots, and 50 kg of water were added, followed by heating at 90° C. until the carrots became soft. Then seasonings and spices in an amount 55 kg in all were added thereto, then 20 kg of waxy corn starch dispersed in 70 kg of water was charged thereinto, and they were heated to 90° C. with stirring to obtain a condensed pasta sauce having a viscosity of 7,500 cp at 70° C. (the added amount of the waxy corn starch was 4.4% based on the total weight of the condensed pasta sauce).

(2) The condensed pasta sauce obtained above was placed in a hopper equipped with a stirrer of a retort pouch packing loader which was the same as that of Example 1 from the bottom of the cooking pan through a pipeline using a transportation pump, and was loaded into retort pouches in a proportion of 60 g/pouch (the temperature of the condensed pasta sauce at the time of loading was 70° C.), then water was loaded in a proportion of 120 g/pouch, and the pouches were sealed, followed by a sterilization treatment by heating at a temperature of 130° C. for 15 min.

(3) Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 3 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 above, and their average value was taken, which results are shown in Table 3 below.

Comparative Example 3

(1): (1) of Example 4 was repeated to prepare a pasta sauce contained in pouches, except that, instead of charging 20 kg of waxy corn starch dispersed in 70 kg of water, charging 10 kg of potato starch and 6.2 kg of a modified starch (SMS-247 manufactured by Matsutani Chemical Industry CO., LTD.) dispersed in 75 kg of water was carried out to obtain a condensed pasta sauce having a viscosity of 7,000 cp at 70° C. (the combined added amount of the potato starch and the modified starch was 3.6% based on the total weight of the condensed pasta sauce).

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 3 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 above, and their average value was taken, which results are shown in Table 3 below.

EXAMPLE 5

(1) 62 kg of soybean salad oil and 11 kg of sesame oil were placed, heated, and stirred in a cooking pot equipped with a steam jacket and after 5 kg of finely chopped garlic was added and fried, 100 kg of boiled enokidakes (cut into 20 mm), 100 kg of boiled bamboo shoots (pieces of 4 mm in thickness, 20 mm in length, and 15 mm in width), 100 kg of boiled mushroom slices, 100 kg of boiled shampignons (loosened), and 75 kg of water-soaked Jew's-ear strips were added. Further, 20 kg of Shiro soysauce, 15 kg of sake, and 56 kg of a combination seasonings and spices were added and then water was added to make 925 kg. They were heated with stirring and when the temperature reached 90° C., 24.6 kg of waxy corn starch dispersed in 50.4 kg of water was charged thereinto, and they were heated again to 90° C. with stirring to obtain a condensed pasta sauce having a viscosity of 3,200 cp at 70° C. (the added amount of the waxy corn starch was 2.5% based on the total weight of the condensed pasta sauce).

(2) The condensed pasta sauce obtained above was placed in a hopper equipped with a stirrer of a retort pouch packing loader which was the same as that of Example 1 from the bottom of the cooking pan through a pipeline using a transportation pump, and was loaded into retort pouches in a proportion of 77 g/pouch (the temperature of the condensed pasta sauce at the time of loading was 70° C.), then hot water at a temperature of 80° C. was loaded in a proportion of 43 g/pouch, and the pouches were sealed, followed by a sterilization treatment by heating at a temperature of 130° C. for 15 min.

(3) Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 3 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 1 above, and their average value was taken, which results are shown in Table 3 below.

TABLE 3

| | | Example 4 | Comparative Example 3 | Example 5 |
|---|---|---|---|---|
| Condensed pasta sauce | Starch | | | |
| | Kind | WC | PS + TS | WC |
| | Added amount (%) | 4.4 | 3.6 | 2.5 |
| | Used proportion of water (%) | 11.8 | 12.2 | 39.6 |
| | Viscosity (70° C.) (cp) | 7000 | 8000 | 3200 |
| | Viscosity (25° C.) (cp) | 30 | 160[1) | 10 |
| Pasta sauce contained in containers | Contained proportion of solid ingredients (%) | | | |
| | Immediately after the start | 20 | 20 | 31 |
| | At the middle | 19 | 20 | 31 |
| | Immediately after the end | 20 | 21 | 30 |
| Quality | | 4.6 | 1.0 | 4.8 |

Kind of starch: WC: waxy corn starch; PS: potato starch; TS: modified starch
[1)]Rotor. No. 1 was used and the value of the viscosity was measured after rotating it at 12 rpm for 1 min.

From the results shown in Table 3 above, in the cases of Examples 4 and 5 wherein 10 to 40% of water to be used in the formulation of the pasta sauce and waxy corn starch in an amount of 1.5 to 5.5% by weight based on the total weight of the pasta sauce immediately before being loaded into a container were used together with other raw materials for the pasta sauce to prepare a pasta sauce having a viscosity of 1,000 to 7,000 cp at 70° to 90° C., the condensed pasta sauce was loaded into a container, and the remaining water was loaded into the container, followed by a sterilization treatment by heating to prepare, it can be understood that the solid ingredients and liquid part can be loaded uniformly into the respective pouches, the obtained pasta sauce has a viscosity of 50 cp or less at normal temperatures, the liquid part of the pasta sauce is not viscous at all or is quite low in viscosity, the pasta sauce is light and palatable, and therefore spaghetti onto which the pasta sauce is poured is made smooth, is made passed through one's throat, and quite tasty.

In contrast, in the case of Comparative Example 3 wherein, instead of waxy corn starch, potato starch and a modified starch were used to prepare a condensed pasta sauce, it can be understood that even the viscosity of that condensed pasta sauce is 1,000 to 7,000 cp (70° C.) that is the same as that of the present invention, the final product that is obtained after loading the condensed pasta sauce into pouches, then adding the remaining water, and sealing the pouches, followed by a sterilization treatment by heating is in short of light taste and spaghetti onto which the obtained pasta sauce is poured is not smooth and is not made agreeably passed through one's throat.

EXAMPLE 6

(1): 13 k g of salad oil was placed, heated, and stirred in a cooking pot with a steam jacket and after 5 kg of finely c hopped garlic and 16 kg of finely chopped celery were added and fried, 80 kg of boiled onions (cut into 10-mm dices), 50 kg of boiled carrots (cut into 5-mm dices), 65 kg of boiled whole corn, and 65 kg of processed powdered milk product dispersed in 130 kg of water were added, 20 kg of milk, and 40 kg of a combination of seasonings and spices were added, then water was added to make 700 kg, and they were heated to 90° C. Then, 16 kg of wheat starch, 23 kg of waxy corn starch, and 25 kg of a modified starch (Pine Ace #5, etherified cross-linked starch, manufactured by Matsutani Chemical Industry CO., LTD.) dispersed in 128 kg of water were added thereto, further 100 kg of boiled and stripped short-necked clams and 8 kg of white wine were added, and they were heated again to 90° C. to obtain a condensed pasta sauce having a viscosity of 18,000 cp at 70° C. (the added amounts of the wheat starch, the waxy corn starch, and the modified starch were 1.6% by weight, 2.3% by weight, and 2.5% by weight, respectively, based on the total weight of the condensed pasta sauce).

(2): The condensed pasta sauce obtained above was placed in a hopper equipped with a stirrer of a retort pouch packing loader (FM4010 model manufactured by Izumi Food Machinery CO., LTD.) from the bottom of the cooking pan through a pipeline using a transportation pump, and was loaded into retort pouches in a proportion of 113 g/pouch (the temperature of the condensed pasta sauce at the time of loading was 70° C.), then hot water at a temperature of 80° C. was loaded in a proportion of 72 g/pouch, and the pouches were sealed, followed by a sterilization treatment by heating at a temperature of 130° C. for 15 min.

(3): Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 5 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 below, and their average value was taken, which results are shown in Table 5 below.

TABLE 4

Evaluation criteria of the quality of the pasta sauce

| Evaluation Point | Meaning |
| --- | --- |
| Point 5: | The solid ingredients were contained in the pasta sauce in suitable quantities to make the taste good, and the liquid part of the pasta sauce was quite mild, creamy, and palatable, and adhered to the spaghetti quite uniformly, which was quite tasty. |
| Point 4: | The solid ingredients were contained in the pasta sauce in suitable quantities to make the taste good, the liquid part of the pasta sauce was mild, almost creamy, and palatable, and adhered to the spaghetti uniformly, which was tasty. |
| Point 3: | The solid ingredients were contained in the pasta sauce nearly in suitable quantities to make the taste good, the liquid part of the pasta sauce was a little mild and a little palatable, and adhered to the spaghetti almost uniformly, which was nearly tasty. |
| Point 2: | The solid ingredients were a little insufficient in the pasta sauce and the liquid part of the pasta sauce lacked a little in mildness, was less palatable, and adhered to the spaghetti a little poorly, which made the taste a little poor. |
| Point 1: | The solid ingredients were rather insufficient in the pasta sauce and the liquid part of the pasta sauce lacked rather in mildness, was little palatable, and adhered to the spaghetti poorly, which made the taste poor. |

EXAMPLE 7

(1): (1) and (2) of Example 6 were repeated to prepare a pasta sauce contained in pouches, except that, in (1) of Example 6, instead of charging 16 kg of wheat starch, 23 kg of waxy corn starch and 25 kg of a modified starch dispersed in 128 kg of water, charging 5 kg of wheat starch, 30 kg of waxy corn starch, and 5 kg of the same modified starch as used in Example 6 dispersed in 152 kg of water was carried out to prepare a condensed pasta sauce having a viscosity of 5,000 cp at 70° C.

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 5 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 5 below.

EXAMPLE 8

(1): (1) and (2) of Example 6 were repeated to prepare a pasta sauce contained in pouches, except that, in (1) of Example 6, instead of charging 16 kg of wheat starch, 23 kg of waxy corn starch and 25 kg of a modified starch dispersed in 128 kg of water, charging 30 kg of wheat starch, 5 kg of waxy corn starch, and 20 kg of the same modified starch as used in Example 6 dispersed in 137 kg of water was carried out to prepare a condensed pasta sauce having a viscosity of 10,000 cp at 70° C.

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 5 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 5 below.

Comparative Example 4

(1): (1) and (2) of Example 6 were repeated to prepare a pasta sauce contained in pouches, except that, in (1) of Example 6, instead of charging 16 kg of wheat starch, 23 kg of waxy corn starch and 25 kg of a modified starch dispersed in 128 kg of water, charging 64 kg of waxy corn starch dispersed in 128 kg of water was carried out.

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 5 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 5 below.

Comparative Example 5

(1): (1) and (2) of Example 6 were repeated to prepare a pasta sauce contained in pouches, except that, in (1) of Example 6, instead of charging 16 kg of wheat starch, 23 kg of waxy corn starch and 25 kg of a modified starch dispersed in 128 kg of water, charging 64 kg of wheat starch dispersed in 128 kg of water was carried out.

(2): Similarly to (3) of Example 1, in the above (1), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 5 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 5 below.

sauce) eventually becomes higher than 500 cp (at normal temperatures) and a creamy-type low-viscous pasta sauce cannot be obtained.

EXAMPLE 9

(1) 30 kg of butter was placed, heated, and stirred in a cooking pot with a steam jacket and after 30 kg of finely chopped garlic was added and fried, 20 kg of boiled red peppers (cut into 5-mm dices), 30 kg of boiled carrots (cut into 5-mm dices), 5 kg of boiled onions, 100 kg of processed milk, and 38 kg of a combination of seasonings and spices

TABLE 5

|  |  | Examples | | | Comparative Examples | |
|---|---|---|---|---|---|---|
|  |  | 6 | 7 | 8 | 4 | 5 |
| Condensed pasta sauce | Added amount of WC starch[1) (%) | 2.3 | 3.0 | 0.5 | 6.4 | — |
|  | Added amount of WC wheat (%) | 1.6 | 0.5 | 3.0 | — | 6.4 |
|  | Added amount of modified starch (%) | 2.5 | 0.5 | 2.0 | — | — |
|  | Used proportion of water (%) | 44.1 | 45.2 | 44.5 | 44.1 | 44.1 |
|  | Viscosity (70° C.) (cp) | 18000 | 5000 | 10000 | 16000 | 14000 |
| Pasta sauce contained in containers | Viscosity (70° C.) (cp) | 320 | 90 | 500 | 30 | 2500 |
|  | Contained proportion of solid ingredients (%) |  |  |  |  |  |
|  | Immediately after the start | 19 | 20 | 19 | 18 | 19 |
|  | At the middle | 18 | 18 | 20 | 20 | 19 |
|  | Immediately after the end | 18 | 19 | 18 | 18 | 20 |
| Quality |  | 5.0 | 4.6 | 4.8 | 1.8 | 1.0 |

[1)Waxy corn starch

From the results shown in Table 5 above, in the cases of Examples 6 to 8 wherein 30 to 65% of water to be used in the formulation of the pasta sauce and waxy corn starch in an amount of 0.5 to 3% by weight, wheat starch in an amount of 0.5 to 3% by weight, and, as the case may be, a modified starch in an amount of 0.5 to 3% by weight, based on the total weight of the pasta sauce immediately before being loaded into a container were used together with other raw materials for the pasta sauce to prepare a condensed pasta sauce having a viscosity of 5,000 to 20,000 cp at 70° C., the condensed pasta sauce was loaded into a container, and the remaining water was loaded into the container, followed by a sterilization treatment by heating to prepare a pasta sauce contained in containers, it can be understood that the solid ingredients and liquid part can be loaded uniformly into the respective pouches, the obtained pasta sauce has a viscosity of 50 to 500 cp at normal temperatures, the liquid part of the pasta sauce is mild, creamy and palatable, and in addition the pasta sauce adheres favorably to boiled pasta, which makes the taste quite good.

In contrast, in the case of Comparative Example 4 wherein 6.4% by weight of waxy corn starch only was added, it can be understood that even if the viscosity of the condensed pasta sauce is adjusted to the range of 5,000 to 20,000 cp (70° C.), the pasta sauce cannot be made mild and creamy.

Further, in the case of Comparative Example 5 wherein only wheat starch was added, it can be understood that, similarly to Example 6, when the condensed pasta sauce whose viscosity has been adjusted to the range of 5,000 to 20,000 cp (70° C.) is loaded into a pouch and the remaining water was added thereto, followed by a sterilization treatment by heating, the viscosity of the final product (pasta were added, then water was added to make 617 kg, and they were heated to 90° C. Then, 30 kg of wheat starch and 26 kg of waxy corn starch dispersed in 210 kg of water were added thereto, and they were heated again to 90° C. and were mixed. Then 80 kg of boiled red salmons (cut into 10-mm dices), 15 kg of white wine, and 8 kg of brandy were added thereto and they were stirred to obtain a condensed pasta sauce having a viscosity of 15,000 cp (70° C.) (the added amounts of the wheat starch and the waxy corn starch were 3.0% by weight and 2.6% by weight, respectively, based on the total weight of the condensed pasta sauce).

(2) The condensed pasta sauce obtained above was placed in a hopper equipped with a stirrer of a retort pouch packing loader which was the same as that of Example 6 from the bottom of the cooking pan through a pipeline using a transportation pump, and was loaded into retort pouches in a proportion of 95 g/pouch (the temperature of the condensed pasta sauce at the time of loading was 70° C.), then hot water at a temperature of 80° C. was loaded in a proportion of 50 g/pouch, and the pouches were sealed, followed by a sterilization treatment by heating at a temperature of 130° C. for 15 min. (3) Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 6 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 6 below.

Comparative Example 6

(1) Example 9 was repeated to prepare a pasta sauce contained in pouches., except that, in (1) of Example 9, instead of charging 44 kg of wheat starch and 26 kg of waxy corn starch dispersed in 210 kg of water, charging 56 kg of waxy corn starch dispersed in 210 kg of water was carried out to obtain a condensed pasta sauce having a viscosity of 15,000 cp at 70° C. (the added amount of the waxy corn starch was 5.6% based on the total weight of the condensed pasta sauce).

(2) Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 6 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 6 below.

Comparative Example 7

(1) Example 9 was repeated to prepare a pasta sauce contained in pouches, except that, in (1) of Example 9, instead of charging 44 kg of wheat starch and 26 kg of waxy corn starch dispersed in 210 kg of water, charging 56 kg of wheat starch dispersed in 210 kg of water was carried out to obtain a condensed pasta sauce having a viscosity of 12,000 cp at 70° C. (the added amount of the wheat starch was 5.6% based on the total weight of the condensed pasta sauce).

(2) Similarly to (3) of Example 1, in the above (2), three items of the pasta sauce contained in the pouches that were obtained immediately after the start of the loading operation, three items of the pasta sauce contained in the pouches that were obtained in the middle of the loading operation, and three items of the pasta sauce contained in the pouches that were obtained immediately before the end of the loading operation were taken out, and one item out of the three items of each of the three sets was measured in the same way as in Example 1 with respect to the proportion of the solid ingredients (solids) contained in the pasta sauce, which gave the results shown in Table 6 below. The remaining two items of each set were poured onto spaghetti that had been boiled in an ordinary manner in a proportion of one item to 300 g of the spaghetti, the spaghetti was eaten by five panelists, the quality was evaluated by the panelists based on the evaluation criteria shown in Table 4 above, and their average value was taken, which results are shown in Table 6 below.

TABLE 6

|  |  | Example | Comparative Examples | |
| --- | --- | --- | --- | --- |
|  |  | 9 | 6 | 7 |
| Condensed pasta sauce | Starch | | | |
|  | Kind | WC + WS | WC | WS |
|  | Added amount (%) | 2.6 + 3.0 | 5.6 | 5.6 |
|  | Used proportion of water (%) | 53.1 | 53.1 | 53.1 |
|  | Viscosity (70° C.) (cp) | 13000 | 15000 | 12000 |
| Pasta sauce contained in containers | Viscosity (25° C.) (cp) | 350 | 30 | 3000 |
|  | Contained proportion of solid ingredients (%) | | | |
|  | Immediately after the start | 31 | 30 | 32 |
|  | At the middle | 30 | 31 | 31 |
|  | Immediately after the end | 32 | 30 | 31 |
| Quality |  | 5.0 | 1.8 | 1.2 |

Kind of starch: WC: waxy corn starch; WS: a modified starch

From the results shown in Table 6 above, in the case of Example 9 wherein 53.1% of water to be used in the formulation of the pasta sauce, waxy corn starch in an amount of 2.6% by weight and wheat starch in an amount of 3.0% by weight based on the total weight of the pasta sauce immediately before being loaded into a container were used together with other raw materials for the pasta to prepare a condensed pasta sauce having a viscosity of 13,000 cp at 70° C., the condensed pasta sauce was loaded into a container, and the remaining water was loaded into the container, followed by a sterilization treatment by heating to prepare a pasta sauce contained in containers, it can be understood that the solid ingredients and liquid part can be loaded uniformly into the respective pouches, the obtained pasta sauce has a viscosity of 350 cp at normal temperatures, the liquid part of the pasta sauce is a little viscous, and is mild, creamy and palatable, and in addition the pasta sauce adheres favorably to boiled pasta, which makes the taste quite good.

In contrast, in the case of Comparative Example 6 wherein 5.6% by weight of waxy corn starch only was added, it can be understood that even if the viscosity of the condensed pasta sauce is adjusted to 15,000 cp (70° C.), the pasta sauce cannot be made mild and creamy.

Further, in the case of Comparative Example 7 wherein only wheat starch was added, it can be understood that, similarly to Example 6, when the condensed pasta sauce whose viscosity has been adjusted to the range of 12,000 cp (70° C.) is loaded into a pouch and the remaining water was added thereto, followed by a sterilization treatment by heating, the viscosity of the final product (pasta sauce) eventually becomes higher than 500 cp (at normal temperatures) and a cream-type low-viscous pasta sauce cannot be obtained.

What is claimed is:

1. A process for preparing a low-viscous pasta sauce contained in a container, comprising the steps of, combining 10 to 65% by weight of an aqueous liquid to be used in formulating a pasta sauce, 0.5 to 5.5% by weight of a waxy starch, and optionally 0.5 to 3% by weight of wheat starch, based on the total weight of the pasta sauce immediately before being loaded into a container, together with other raw materials for the pasta sauce to prepare a condensed pasta sauce; loading the condensed pasta sauce into the container; adding 35 to 90% by weight of the aqueous liquid into the container after, simultaneously with, or before the loading of the condensed pasta sauce into the container; and sterilizing by heating to make a pasta sauce having a viscosity of 500 cp or less at normal temperatures (25° C.).

2. A process for preparing a low-viscous pasta sauce contained in a container, comprising the steps of: combining 10 to 40% by weight of an aqueous liquid to be used in formulating a pasta sauce and 1.5 to 5.5% by weight of a waxy starch, based on the total weight of the pasta sauce immediately before being loaded into a container, together with other raw materials for the pasta sauce to prepare a condensed pasta sauce; loading the condensed pasta sauce into the container; adding 60 to 90% by weight of the aqueous liquid into the container after, simultaneously with, or before the loading of the condensed pasta sauce into the container; and sterilizing by heating to make a pasta sauce having a viscosity of 50 cp or less at normal temperatures (25° C.).

3. A process for preparing a low-viscous pasta sauce contained in a container, comprising the steps of: combining 30 to 65% by weight of an aqueous liquid to be used in formulating a pasta sauce, 0.5 to 3% by weight of a waxy starch, and 0.5 to 3% by weight of wheat starch, based on the total weight of the pasta sauce immediately before being loaded into a container, together with other raw materials for the pasta sauce to prepare a condensed pasta sauce; loading the condensed pasta sauce into the container; adding 35 to 70% by weight of the aqueous liquid into the container after, simultaneously with, or before the loading of the condensed pasta sauce into the container; and sterilizing by heating to make a pasta sauce having a viscosity of 50 to 500 cp at normal temperatures (25° C.).

4. The process as claimed in claim 3, wherein when said condensed pasta sauce is prepared, 0.5 to 3% by weight of a modified starch based on the total weight of the pasta sauce immediately before being loaded into a container is added.

* * * * *